United States Patent
Ryan, Jr.

(10) Patent No.: US 7,707,124 B2
(45) Date of Patent: Apr. 27, 2010

(54) MAIL PIECE VERIFICATION SYSTEM HAVING FORENSIC ACCOUNTING CAPABILITY

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 2346 days.

(21) Appl. No.: 09/777,592

(22) Filed: Feb. 5, 2001

(65) Prior Publication Data

US 2002/0026430 A1 Feb. 28, 2002

Related U.S. Application Data

(63) Continuation-in-part of application No. 09/649,470, filed on Aug. 28, 2000, now Pat. No. 6,810,390, and a continuation-in-part of application No. 09/748,889, filed on Dec. 27, 2000.

(51) Int. Cl.
G07B 17/02 (2006.01)
(52) U.S. Cl. ...................................... 705/404
(58) Field of Classification Search .................. 705/404, 705/405, 60, 40; 380/51
See application file for complete search history.

(56) References Cited

U.S. PATENT DOCUMENTS

| | | | |
|---|---|---|---|
| 4,511,793 A | 4/1985 | Racanelli | |
| 4,641,346 A | 2/1987 | Clark et al. | 380/3 |
| 4,649,266 A | 3/1987 | Eckert | 235/432 |

(Continued)

FOREIGN PATENT DOCUMENTS

WO WO 98/57304 * 6/1997

(Continued)

OTHER PUBLICATIONS

Webb, Warren, "Electronic Stamps Lick Internet Security (How It Works)," EDN, vol. 43, No. 16, Aug. 3, 1998, p. 44(2).*

(Continued)

Primary Examiner—John W Hayes
Assistant Examiner—Nathan Erb
(74) Attorney, Agent, or Firm—Brian A. Lemm; Angelo N. Chaclas (57) ABSTRACT

A mail piece verification system for processing mail pieces having associated therewith respective mail piece data. The system includes a plurality of postage metering systems for preparing mail pieces, a plurality of mail processing centers for receiving mail pieces and obtaining the respective mail piece data and a data center means in operative communication with the plurality of postage metering systems and the plurality of mail processing centers, the data center means including a plurality of account files corresponding to the plurality of postage metering systems. The data center means stores reset data in each of the plurality of account files representative of reset activity associated with the plurality of postage metering systems, respectively, receives respective mail piece data corresponding to the mail pieces from the plurality of mail processing centers, uses the respective mail piece data, storing empirical data in each of the plurality of account files representative of mailing activity associated with the plurality of postage metering systems, respectively, and conducts a forensic accounting analysis of the empirical data and the reset data associated with a selected postage metering system.

11 Claims, 3 Drawing Sheets

U.S. PATENT DOCUMENTS

| | | | | |
|---|---|---|---|---|
| 4,660,221 | A | 4/1987 | Dlugos | 380/23 |
| 4,743,747 | A | 5/1988 | Fougere et al. | |
| 4,752,950 | A | 6/1988 | Le Carpentier | |
| 4,853,961 | A | 8/1989 | Pastor | 380/21 |
| 4,873,645 | A | 10/1989 | Hunter | |
| 4,933,849 | A * | 6/1990 | Connell et al. | 700/90 |
| 4,965,829 | A | 10/1990 | Lemelson | |
| 5,142,577 | A | 8/1992 | Pastor | 380/21 |
| 5,216,620 | A | 6/1993 | Sansone | 364/478 |
| 5,280,531 | A * | 1/1994 | Hunter | 382/101 |
| 5,390,251 | A | 2/1995 | Pastor et al. | 380/21 |
| 5,612,889 | A | 3/1997 | Pintsov et al. | 364/478.14 |
| 5,661,803 | A | 8/1997 | Cordery et al. | 380/21 |
| 5,666,421 | A | 9/1997 | Pastor et al. | 380/51 |
| 5,687,237 | A | 11/1997 | Naclerio | 380/29 |
| 5,715,164 | A | 2/1998 | Liechti et al. | |
| 5,731,574 | A | 3/1998 | Bodie et al. | 235/375 |
| 5,748,780 | A | 5/1998 | Stolfo | |
| 5,774,554 | A | 6/1998 | Gilham | 380/51 |
| 5,805,701 | A | 9/1998 | Ryan, Jr. | 380/21 |
| 5,812,401 | A | 9/1998 | Moore | 705/410 |
| 5,819,239 | A * | 10/1998 | Berson et al. | 705/403 |
| 5,878,136 | A | 3/1999 | Kim et al. | 380/21 |
| 5,917,925 | A * | 6/1999 | Moore | 382/101 |
| 5,936,865 | A | 8/1999 | Pintsov et al. | 364/478 |
| 5,953,710 | A * | 9/1999 | Fleming | 705/38 |
| 6,035,290 | A * | 3/2000 | Pintsov | 705/405 |
| 6,039,257 | A | 3/2000 | Berson et al. | 235/468 |
| 6,049,775 | A | 4/2000 | Gertner et al. | |
| 6,064,994 | A | 5/2000 | Kubatzki | 705/410 |
| 6,064,995 | A | 5/2000 | Sansone et al. | 705/410 |
| 6,119,051 | A | 9/2000 | Anderson, Jr. et al. | |
| 6,125,357 | A | 9/2000 | Pintsov | 705/408 |
| 6,249,777 | B1 | 6/2001 | Kara et al. | 705/404 |
| 6,398,106 | B1 | 6/2002 | Ulvr et al. | |
| 6,711,680 | B1 * | 3/2004 | Cordery | 713/176 |
| 6,795,813 | B2 * | 9/2004 | Allport et al. | 705/60 |

FOREIGN PATENT DOCUMENTS

| | | | |
|---|---|---|---|
| WO | WO 98/57306 | * | 6/1997 |
| WO | WO02/25597 | | 3/2002 |

OTHER PUBLICATIONS

Cullen, M.; Pintsov, L.; Romansky, B.; "Reading Encrypted Postal Indicia," Proceedings of the Third International Conference on Document Analysis and Recognition, IEEE Computer Society Press, 1995, vol. 2, pp. 1018-1023.

Postal Automation Systems, websit: www.lockheadmartin.com.

10/9/1 (Item 1 from file: 16) DIALOG (R)File 16:Gale Group PROMT(R) (c) 2002 The Gale Group. All rts. reserv. 03365745 Supplier No. 44667304 (This is the Full Text) Experts Look to Existing Networks to Interconnect 'Smart Roads'.

* cited by examiner

(PRIOR ART)

MAIL PIECE VERIFICATION SYSTEM HAVING FORENSIC ACCOUNTING CAPABILITY

CROSS REFERENCE TO RELATED APPLICATIONS

This application is a continuation-in-part application of the following patent applications, the disclosures of which are specifically incorporated herein by reference: U.S. patent application Ser. No. 09/649,470, entitiled SYSTEM AND METHOD FOR VERIFYING DIGITAL POSTAL MARKS (E-998) filed on Aug. 28, 2000 now U.S. Pat No. 6,810,390; and U.S. patent application Ser. No. 09/748,889, entitiled MAIL PIECE VERIFICATION SYSTEM (F-212) filed on Dec. 27, 2000.

FIELD OF THE INVENTION

This invention relates to mail piece verification systems. More particularly, this invention is directed to a mail piece verification system conducting successive verification activities on a mail piece along different stages of a mail processing system.

BACKGROUND OF THE INVENTION

Generally, postage metering systems are well known in the art. Typically, the traditional mechanical and electronic postage meters have employed physical security and specialized inks to prevent fraud. The registers that maintain an accounting of postal funds have been located within a secure housing along with a dedicated printer. As a further measure, the dedicated printers have used fluorescent ink to provide an extra aid in the detection of an authentic postage meter indicium.

More recently, postal authorities have promulgated regulations that allow postage meter manufacturers to utilized digital printing technology (laser, ink jet, thermal transfer, etc.), either embedded as part of a mail handling system or as a general purpose office printer. As an example, the United States Postal Service (USPS) has enabled the decoupling of the postage meter and the printer and allowed the use of digital printers by establishing an Information-Based Indicia Program (IBIP). The IBIP is a distributed trusted system established by the USPS to retrofit and augment existing postage meters using new technology known as information-based indicia. The IBIP relies on digital signature techniques to produce for each mail piece an indicium whose origin cannot be repudiated. Thus, in contrast to traditional postage metering systems employing mechanical printing technology and physical security, the IBIP supports new methods of securely applying postage to mail pieces. Generally, the IBIP requires printing a high-density two-dimensional (2D) bar code on a mail piece. The 2D barcode encodes various information associated with the mail piece and is subsequently signed with a digital signature.

The USPS has published detailed specifications for the IBIP. Generally, the IBIP is directed to two types of postage metering systems. The first type is referred to as a closed system and is defined in the INFORMATION BASED INDICIA PROGRAM—PERFORMANCE CRITERIA FOR INFORMATION-BASED INDICIA AND SECURITY ARCHITECTURE FOR CLOSED IBI POSTAGE METERINGS SYSTEMS, dated Jan. 12, 1999, ("IBIP Closed System Specification"). The second type is referred to as an open system and is defined in the INFORMATION BASED INDICIA PROGRAM—PERFORMANCE CRITERIA FOR INFORMATION-BASED INDICIA AND SECURITY ARCHITECTURE FOR OPEN IBI POSTAGE EVIDENCING SYSTEMS, dated Feb. 23, 2000, ("IBIP Open System Specification"). Together, the IBIP Closed System Specification and the IBIP Open System Specification define the requirements for next generation postage metering systems.

Although the transition to digital printing provides many advantages, the postal authorities recognize that digital printing spawns potential new forms of fraud. As an example, an individual seeking to commit a fraud upon the postal authority need only utilize their computer, image scanner and printer to generate multiple copies of a single postal indicium. Thus, a valid indicium may be replicated perfectly. This technique is referred to as fraud by duplication.

As a result, measures have been developed to detect such attempts to defraud the postal authorities. Typically, these measures involve verifying the authenticity of the postal indicium on a mail piece as the mail piece is being processed by the postal authority. This verification activity seeks to ensure that the postage amount shown in the postal indicium has been properly accounted for. For instance, the postal authority may validate the digital signature discussed above to determine the authenticity of the postal indicium. However, this will not necessarily expose a second mail piece with a duplicated postal indicium representing an exact copy of a valid indicium. Thus, detection of these types of duplicates, and other issues, present problems for the postal authorities.

Another problem faced by the postal authorities is the intensive data processing required of a distributed mail processing system employing a plurality of remotely located processing centers. Typically, the processing center must scan each postal indicium to obtain its data, conduct database lookups, perform cryptographic calculations and determine whether or not the postal indicium is valid. If a mail piece cannot be validated, it is diverted to an out sort bin for further investigation and/or return to the sender. Complicating this situation is the fact that such verification processing is conducted by a single mail piece processing system. This necessitates that the verification processing is completed during the interval between mail piece scanning and the diversion location to the out sort bin. Given the rate at which the processing machines operate (up to 12 mail pieces per second), there is very little time to perform verification checks.

Still further complications exist. If the cryptographic computations are to be performed locally (on individual processing machines), then large amounts of data must be distributed to all of the processing machines (e.g. cryptographic keys for each postage meter, data to enable detection of duplicate indicia) and kept updated to reflect changes in the meter population. On the other hand, if the computations are performed remotely, then the postal indicium data for each mail piece must be transmitted in real time to a central location, validated and the results returned to the processing machine before the mail piece reaches the diversion point. Both of these arrangements require significant real time processing and rapid database access.

Yet another problem is the risk that the digital signatures and cryptography underlying the security of the postal system could be compromised. This could occur because of a successful attack or the release/use of information necessary to generate valid postal indicia by someone (a postal authority employee) having access to the security system. Once compromised in this manner, someone could print "valid" postal indicia that would pass verification by the postal authority. Thus, the postal authority would suffer losses from a fraudulent actor submitting postal indicia into the postal system that to all appearances would be beyond reproach.

Therefore, there is a need for a mail piece verification system that provides operational advantages over those described above. Furthermore, there is a need for a mail piece verification system that includes a forensic accounting capability for improving upon the detection of apparently valid postal indicia.

SUMMARY OF THE INVENTION

Accordingly, it is an object of the present invention to provide a mail piece verification system that addresses the drawbacks and disadvantage of the prior art systems.

In accomplishing these and other objects there is provided a mail piece verification system for processing mail pieces having associated therewith respective mail piece data. The system includes a plurality of postage metering systems for preparing mail pieces, a plurality of mail processing centers for receiving mail pieces and obtaining the respective mail piece data and a data center in operative communication with the plurality of postage metering systems and the plurality of mail processing centers, the data center including a plurality of account files corresponding to the plurality of postage metering systems. The data center stores reset data in each of the plurality of account files representative of reset activity associated with the plurality of postage metering systems, respectively, receives respective mail piece data corresponding to the mail pieces from the plurality of mail processing centers, uses the respective mail piece data, storing empirical data in each of the plurality of account files representative of mailing activity associated with the plurality of postage metering systems, respectively, and conducts a forensic accounting analysis of the empirical data and the reset data associated with a selected postage metering system.

Additionally, there are provided a method of operating the mail piece verification system, a method of operating a data center for processing mail piece data and a data structure, respectively, that are generally analogous to the summary provided above.

Therefore, it should now be apparent that the invention substantially achieves all the above objects and advantages. Additional objects and advantages of the invention will be set forth in the description which follows, and in part will be obvious from the description, or may be learned by practice of the invention. Moreover, the objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
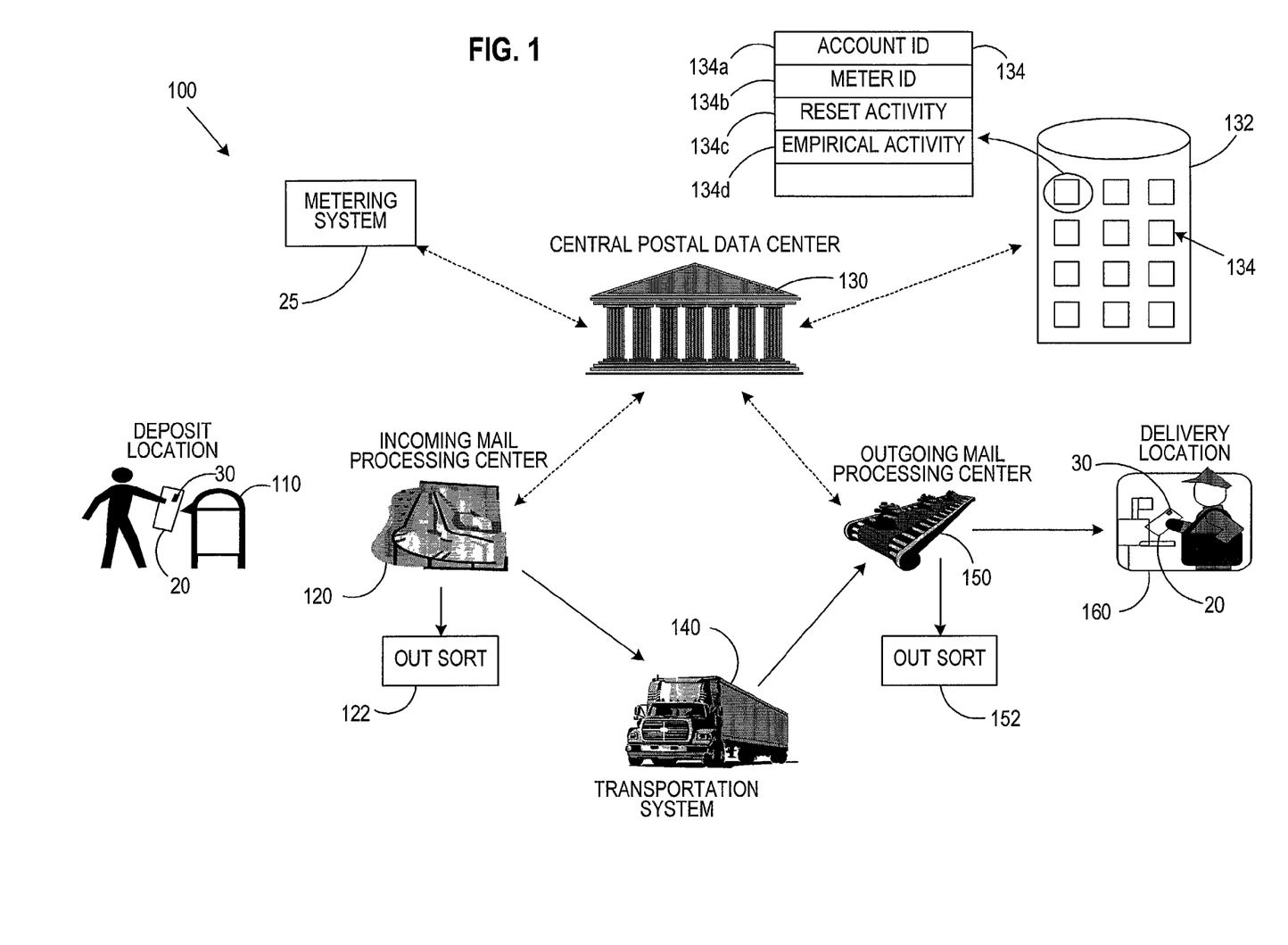
FIG. 1 is a schematic representation of a mail piece verification system in accordance with the present invention.

Referring to FIG. 1, a schematic representation a mail piece verification system 100 for processing a mail piece 20 (envelope, post card, package, label, e-mail, or the like), produced by a postage metering system 25 and having a postal indicium 30 printed thereon (or attached to, embedded in or otherwise associated with electronic forms of the mail piece 20), in a path of travel as indicated by the solid arrows is shown. The mail piece verification system 100 includes a deposit location 110, an incoming mail processing center 120 having an incoming out sort bin 122, a central postal data center 130, a transportation system 140, an outgoing mail processing center 150 having an outgoing out sort bin 152 and a delivery location 160. The central postal data center 130 includes an account database 132 and is in operative communication with the incoming mail processing center 120 and the outgoing mail processing center 150 over any suitable conventional communication network, such as: telephone lines, a local area network, a wide area network, the Internet or the like. The account database 132 includes a plurality of customer account files 134, described in greater detail below. Generally, as shown in FIG. 1, the solid lines with arrows are intended to represent the flow of the mail piece 20 while the dashed lines with arrows are intended to represent data flow, as described in greater detail below.

For the sake of clarity, the mail piece verification system 100 has been shown with respect to a particular mail piece 20 and a single postage metering system 25. Those skilled in the art will recognize that the mail piece verification system 100 may employ a plurality of deposit locations 110 that receive mail pieces 20 from a plurality of postage metering systems 25 and direct them to a plurality of incoming mail processing centers 120. From these centers 120, the mail pieces 20 are transported over a plurality of transportation systems 140 to a plurality of outgoing mail processing centers 150 so that the mail pieces may be delivered to a plurality of delivery locations 160, accordingly. Thus, the mail piece verification system 100 represents a network of systems that connect the deposit locations 110 to the delivery locations 160. Each mail piece 20 is routed through the mail piece verification system 100 (network) according to numerous factors, such as: the class of service selected and the physical locations of the deposit 110 and the delivery location 160.

The deposit location 110 may be any acceptance point (post office window, mail box, computer server, etc.) that the postal authority has designated for receiving mail pieces 20 from the public. The incoming mail processing center 120 may or may not be co-located with the deposit location 110. In either case, the mail pieces 20 are directed by postal authority to the incoming mail processing center 120 which may employ one or more mail processing machines, such as the Small Parcel and Bundle Sorter, the Advanced Facer Canceller System or the Flats Sorting Machine, all available from Lockheed Martin—Postal Automation Systems. These mail processing machines typically perform preliminary tasks on the mail pieces 20, such as: culling, positioning (facing the mail piece), POSTNET bar code printing, sorting and the like. Any mail pieces 20 that are deemed unacceptable are diverted to the out sort bin 122. Once the preliminary mail processing tasks are completed, the mail piece 20 travels over the transportation system 140 to the outgoing mail processing center 150. The transportation system 140 may employ any suitable combination of physical transport, such as: truck, plane, boat, car, computer network, or the like. The outgoing mail processing center 150 is very similar to the incoming mail processing center 120 and may employ one or more of the same types of mail processing machines described above. These mail processing machines typically perform secondary tasks on the mail pieces 20, such as: culling, positioning, POSTNET bar code reading, sorting and the like. Any mail pieces 20 that are deemed unacceptable are diverted to the out sort bin 152. Once the secondary mail processing tasks are completed, the mail piece 20 is routed via a designated post office to the delivery location 160 (home address, business address, post office box, computer account, IP address or the like).

Those skilled in the art will recognize that any combination of incoming mail processing centers 120, transportation systems 140 and outgoing mail processing centers 150 may be employed to effect receipt of the mail piece 20 at the deposit location 110 and route the mail piece 20 to the delivery location 160. For example, many intermediate processing centers may be employed and the transportation system 140 may be deployed in stages. Numerous factors, such as the class of service and the physical proximity of the deposit location 110 to the delivery location 160, may influence the exact route that a particular mail piece 20 may take while it is in transit.

Furthermore, those skilled in the art will appreciate that the incoming mail processing center 120 and the outgoing mail processing center 150 may be co-located. In fact, they may actually be the same mail processing center. In some ways what differentiates the incoming mail processing center 120 from the outgoing mail processing center 150 is the status of the mail piece 20. If the mail piece 20 has just been received, then the mail processing center is operating as the incoming mail processing center 120. On the other hand, if the mail piece 20 is well along its delivery route, then the mail processing center is operating as the outgoing mail processing center 150. Thus, at any given location, the same mail processing center may be operating as both an incoming mail processing center 120 (for the mail pieces 20 that have just been deposited for delivery) and as an outgoing mail processing center 150 (for the mail pieces 20 that have already been processed and are nearing their delivery points).

Still further, instead of being a singular facility, the postal data center 130 may be embodied as a plurality of regional postal data centers that are geographically dispersed and networked together using suitable communication techniques. This may allow for various advantages, such as: system redundancy (in case of failures), quicker response times and reduced communication expenses, while preserving the benefits of the communication path ways generally described above and in more detail below.

Figure 2:
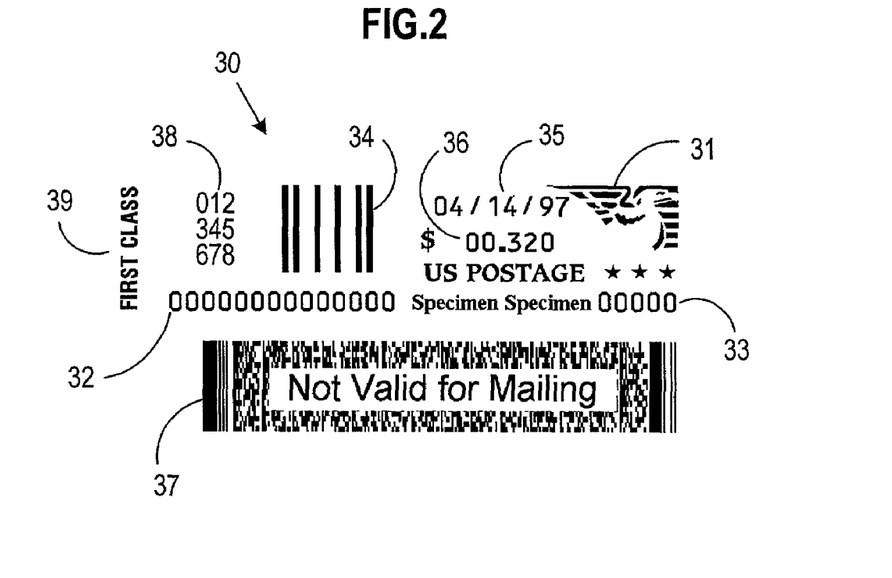
FIG. 2 is an example of a postal indicium printed by a postage metering system that is processed by the mail piece verification system in accordance with the present invention.

Generally, the plurality of postage metering systems 25 are in communication with the central postal data center 130 over any conventional communication lines for the purpose of conducting remote inspections and meter resets (downloading of postal funds) as is known in the art. The postage metering systems 25 may be of any conventional type, such as those commercially available (ClickStamp® Online, PostPerfect®, Paragon® II, DM200™, etc.) from Pitney Bowes Inc. of Stamford, Conn. A historical account of the disbursement of these postal funds is maintained in the account database 132. Each of the plurality of customer account files 134 includes an account identifier (numeric, alpha-numeric, etc.) 134a, a list of postage meter serial numbers (one or more) 134b associated with the account identifier 134a, meter reset activity data 134c and empirical mailing activity data 134d (described in greater detail below). The postage meter serial numbers 134b correspond to the meter serial number 32 that in printed in the postal indicium 30. Preferably, the reset activity data 134c includes a reset date and a reset amount that is stored for each meter reset transaction associated with each particular postage metering system 25. Thus, a historical log of an amount of postage that has been purchased by each postage metering system 25 is maintained. Those skilled in the art will recognize that the account identifier 134a and the postage meter serial numbers 134b may be collapsed into a single identifier that serves to identify the customer.

Referring to FIG. 2 in view of FIG. 1, a more detailed view of the postal indicium 30 printed by the postage metering system 25 is shown. Since the postal indicium 30 does not constitute a part of the present invention, the following description is being provided with respect to a particular type of postal indicium 30 by way of background. Generally, the postal indicium 30 includes both fixed data that does not change from indicium to indicium and variable data that may change. The fixed and variable data may change depending upon postal authority requirements and the needs of the postage system manufacturer, but generally can be summarized as follows. The fixed data includes a graphic design 31 (an eagle with stars and US POSTAGE), a meter serial number 32 uniquely identifying the postage meter (not shown) that produced the postal indicium 30, a licensing post office ID (Zip Code) 33 and an optional facer identification mark (FIM) 34 used during post office processing. The variable data includes a date 35 indicating when the postage was dispensed, a postal value 36 indicating an amount of postage, an indication of a service class (first class, bulk rate, priority, overnight, certified, etc.) that has been selected for the mail piece 20, a bar code 37 containing both elements of both fixed and variable data and, in the most preferred embodiment, authentication information 38. The bar code 37 may be of any conventional format and is provided for the purpose of improving machine readability and increasing automated processing of the mail piece 20. Generally, the authentication information 38 is an encrypted message, such as a digital signature, digital token or other data, derived from the information contained with the postal indicium 30. The authentication information 38 may be in any format, such as: alphanumeric string, bar code or the like. Most preferably, the authentication information 38 is incorporated into the bar code 37. Using the authentication information 38 and other data contained within the postal indicium 30, the postal authority can verify the authenticity of the postal indicium 30 using conventional techniques. Thus, the postal indicium 30 may also be classified as containing authentication information 38 and non-authentication information 31-37 and 39.

As mentioned above, the postal indicium 30 need only be associated with the particular mail piece 20. Therefore, when the mail piece 20 takes electronic form, the postal indicium 30 may be reconfigured accordingly.

Figure 3:
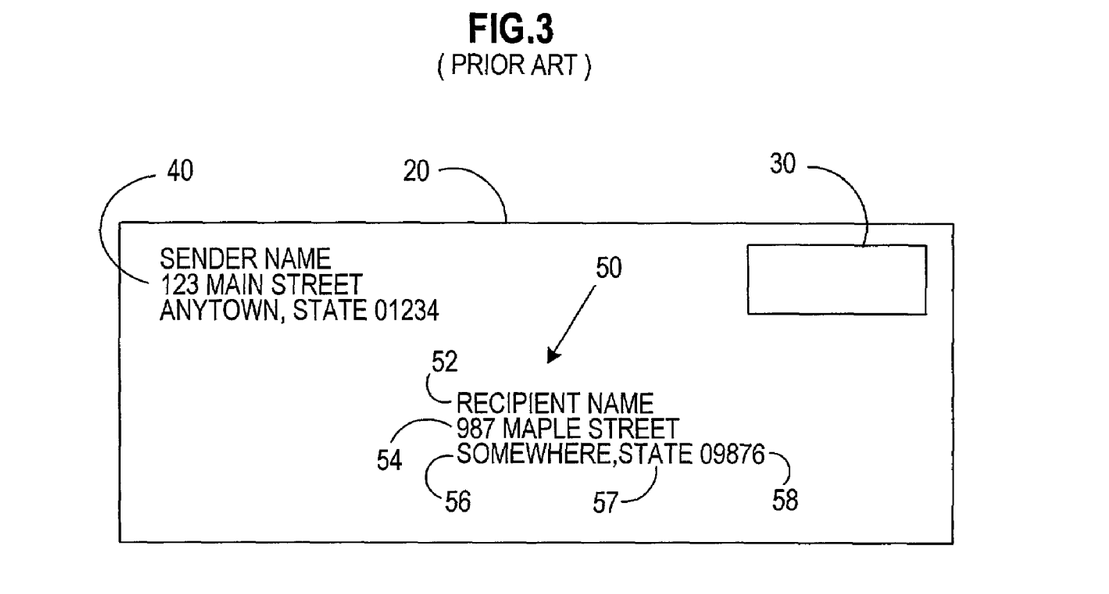
FIG. 3 is an example of a prior art mail piece that may be verified by the verification system in accordance with the present invention.

Referring to FIG. 3, in view of FIGS. 1 and 2, an example of a prior art mail piece 20 that may be processed by the verification system 100 is shown. The mail piece 20 includes the postal indicium 30 (as described above) produced by a postage metering system 25, a sender address 40 (optional) and a recipient address 50. The recipient address 50 provides information to the postal authority corresponding to the delivery location 160. The typical recipient address 50 includes a recipient name 52 (personal, business or generic (occupant)), recipient delivery information 54 (street address, post office box number, etc.), a city name 56, a state name 57 and a ZIP code 58.

Figures 4, 5:
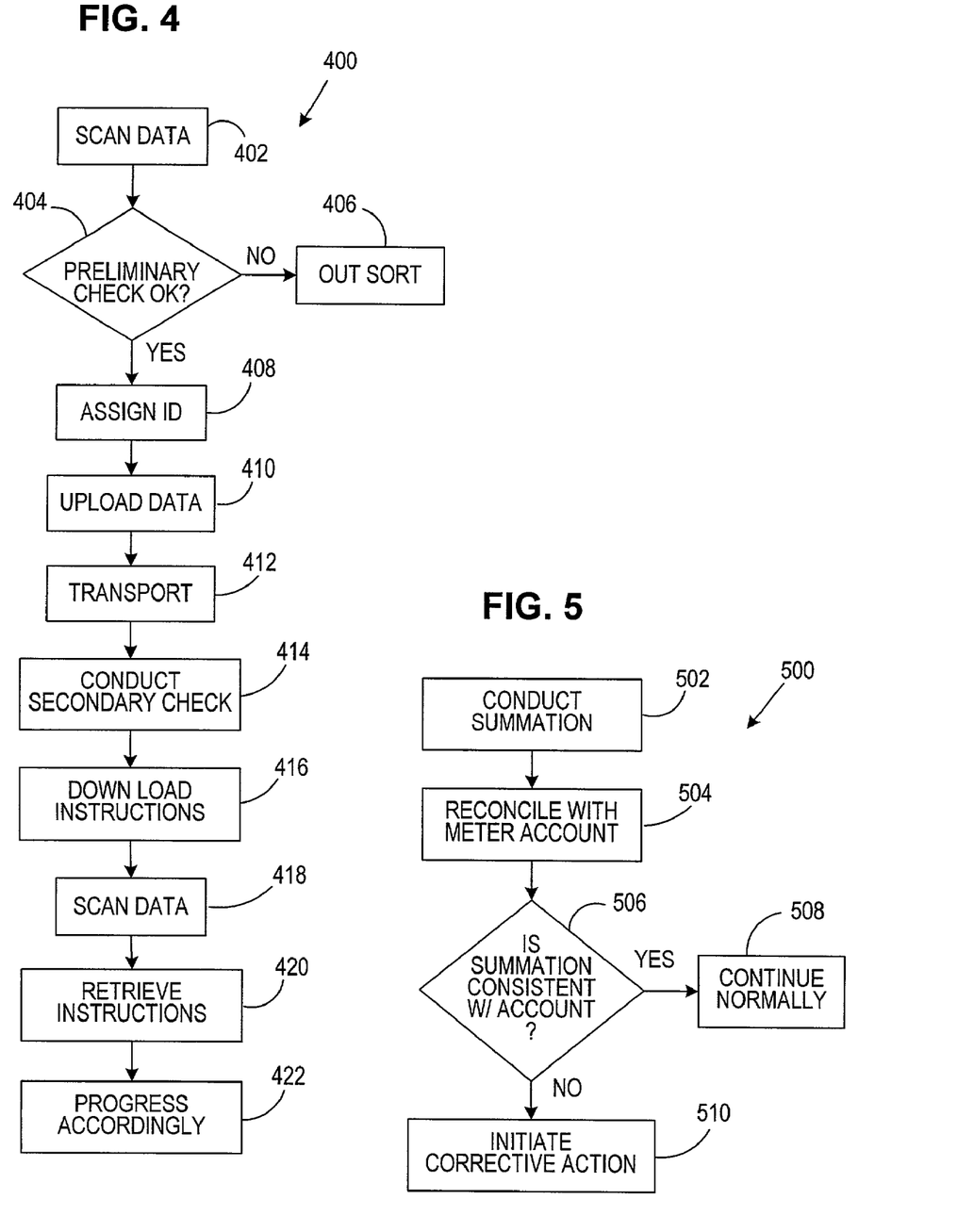
FIG. 4 is a flow chart depicting the operation of the mail piece verification system in accordance with the present invention.
FIG. 5 is a flow chart depicting an account reconciliation routine conducted by the mail piece verification system in accordance with the present invention.

With the structure of the present invention described as above, the operational characteristics will now be described with respect to receipt and delivery of the mail piece 20. For the sake of clarity, it is assumed that the mail piece 20 is processed by only one incoming mail processing center 120 and only one outgoing mail processing center 150. Referring primarily to FIG. 4 while referencing the structure of FIGS. 1, 2 and 3, a flow chart 400 of the general operation of the mail piece verification system 100 in accordance with the present invention is shown. A further detailed discussion of a forensic account reconciliation routine is provided below.

After receiving the mail piece 20 at the deposit location 110, at 402, the mail piece 20 is scanned at the incoming mail processing center 120 to obtain mail piece data. The mail piece data may include the postal indicium 30, the recipient address 50, the sender address 40 or any combination or subset of the above. Next, at 404, a determination may optionally be made whether or not the mail piece 20 meets preliminary conditions. In the most preferred embodiment, the preliminary conditions do not involve cryptographic calculations or access to complicated databases. The preliminary conditions may include: recognition of a valid meter serial number 32, a posting date 35 within an acceptable range of the current date, suitable readability of the mail piece 20 in terms of accuracy and completeness and recognition of a valid recipient address 50. If at 404 the answer is no, then at 406 the mail piece 20 is out sorted to out sort bin 122 for further investigation, human reading, return to the sender or some other suitable action. On the other hand, if the answer at 404 is yes, then at 408 a global identification number (preferably an alphanumeric string) (not shown) is assigned to the mail piece 20 that uniquely identifies the mail piece 20 to the postal authority. The global identification number may preferably be chosen to reflect other information, such as: the particular incoming mail processing center 110 that received the mail piece 20. Optionally, the global identification number may be printed on the mail piece 20 in bar code or some other conventional format. Generally, the global identification numbers are allocated to the incoming mail processing center 120 by the central postal data center 130. In this way, the incoming mail processing center 120 may assign the numbers one at a time as the mail pieces 20 are received. Next, at 410, the mail piece data and the global identification number are uploaded from the incoming mail processing center 120 to the central postal data center 130. Next, at 412, the mail piece 20 is advanced downstream in the path of travel along the delivery route by the transportation system 140. Next, at 414, the central postal data center 130 conducts an analysis to see if the mail piece 20 meets secondary conditions. In the most preferred embodiment, the secondary conditions involve cryptographic calculations to determine the validity of the postal indicium 30. Those skilled in the art will recognize that the mail piece data may be transmitted to a central postal data center 130 for verification either immediately or as a batch process at some later time. Since the incoming mail processing center 120 does not perform cryptographic verification checks, there is no need to distribute sensitive information (e.g., cryptographic keys, "license plates," duplicate data and the like) to the incoming mail processing center 120. In addition, the computational requirements for the incoming mail processing center 120 are significantly reduced (no need to rapidly perform database lookups or cryptographic operations).

Next, at 416, the central postal data center 130 downloads instructions, as necessary, to the outgoing mail processing center 150 for use in processing the mail piece 20. In the most preferred embodiment, the processing instructions are associated with the global identification number of the mail piece 20. For example, the instruction may indicate that the mail piece 20 should be diverted to the out sort bin 152 for follow up by a postal authority investigator. As another example, the instructions may indicate that the mail piece 20 should be processed in a normal fashion. In the alternative, instructions may only be supplied for "special" (other than normal) processing. In this situation, the absence of a special instruction (divert instruction) may indicate that the outgoing mail processing center 150 should process the mail piece 20 in a normal fashion. Next, at 418, the outgoing mail processing center 150 scans the mail piece 20 to obtain the global identification number. As discussed above, it may have even been printed on the mail piece 20 by the incoming mail processing center 120. Next, at 420, the outgoing mail processing center 150 retrieves any processing instructions associated with the global identification number through simple database access. Next, at 422, the outgoing mail processing center 150 processes the mail piece 20 in accordance with the processing instructions, as described above.

With the basic operation of the mail piece verification system described as above, a forensic account reconciliation routine that may be additionally performed by the data center 130 will now be described. Referring primarily to FIG. 5 while referencing the structure of FIGS. 1, 2 and 3, a flow chart 500 of the account reconciliation routine of the mail piece verification system 100 in accordance with the present invention is shown. At 502, the central postal data center 130 conducts a summation of all the mail piece data associated with each individual mail piece 20 that has been processed by the plurality of incoming mail processing centers 120. Preferably, this summation analysis occurs at predetermined occasions (time based and/or event based) and gathers the mail piece data by the account identifier 134$a$ and/or by postage meter serial number 134$b$. Thus, the summation analysis yields data indicative of the empirical activity associated with each account identifier 134$a$ and/or postage meter serial number 134$b$ for a given time period. Accordingly, respective empirical activity data 134$d$ is stored in each of the plurality of customer account files 134. The empirical activity data 134$d$ may include piece counts for each given mail class, postage amounts or any other mailing activity related data sufficient to derive an exact or reliable estimate of an amount of postage consumed. Thus, a historical account of observed mailing activity is maintained by the empirical activity data 134$d$. Next, at 504, the central postal data center 130 reconciles the reset activity data 134$c$ with the empirical activity data 134$d$ for consistency. This may involve any degree of forensic account analysis to determine the fidelity of the empirical activity data 134$d$ in view of the reset activity data 134$c$. An example will now be provided. The reset activity data 134$c$ may be used to ascertain an amount of postage that has been purchased by a respective postage metering system 25 over a given time period. Likewise, the empirical activity data 134$d$ may be used to ascertain an amount of postage that has been consumed in relation to the given time period. Thus, by comparing the purchased postage amount with the consumed postage amount, the propriety of the customers mailing activities may be established. Those skilled in the art will recognize that because there is generally a time lag between when postage is purchased and when it is consumed, care must be taken when defining what postage purchases should be compared against what mailing activity.

Next, at 506, a determination is made whether or not the reset activity data 134c is consistent with the empirical activity data 134d. For the sake of clarity, it should be understood that this determination could be made for each one of or any subset of the plurality of customer account files 134. Thus, the plurality of customer account files 134 selected for analysis may be those where suspicions have arisen or based on a period sampling for audit purposes. If at 506 the answer is yes, then at 508 the routine 500 continues normally and no responsive (corrective and/or investigative) action is taken with respect to the customer account file 134/meter serial number 134b for which the forensic analysis was conducted. On the other hand, if the answer at 506 is no, then at 510 responsive action is taken. Many possibilities for responsive action exist. As an example, an inspection of the metering system 25 may be conducted. This inspection may involve dispatching an authorized representative to perform a site inspection at the customer's location and/or a remote diagnostic inspection during a subsequent communication session between the metering system 25 and the data center 130. These inspections would seek to determine if the metering system 25 has been tampered with either physically or electronically. As another example, delivery of mail pieces 20 from the suspect customer account file 134/meter serial number 134b may be withheld. As yet another example, new graphic data 31 may be down loaded to the metering system 25 during a subsequent communication session with the data center 130. The new graphic data 31 may include a tell (hidden clue) that facilitates discerning whether or not the fraudulent indicium 30 has been created by the customer or a third party. As yet still another example, a new meter serial number 134b may be issued to replace the existing meter serial number 134b from the suspect customer account file 134/meter serial number 134b. Preferably, this occurs after the postage metering system 25 has passed inspection. Then, delivery of mail pieces 20 containing the existing meter serial number 134b may be withheld while delivery of mail pieces 20 containing the new meter serial number 134b may continue normally. In this manner, any fraudulent use of the existing meter serial number 134b by third parties will be met with a suitable counter measure from the postal authority while the rightful use of the new meter serial number 134b by the customer continues uninterrupted. As yet still another example, the data center 130 may limit a recharge amount of postage that may be downloaded to the postage metering system 25 during a reset operation. In this way, a closed system type of postage metering system 25 would likely have to contact the data center 130 more frequently and thus allow more frequent remote inspections of the postage metering system 25. Advantages for open system type postage metering systems 25 may also apply. Those skilled in the art will recognize that the examples described above are mutually exclusive and may be implemented in any combination.

The data center 130 may execute this responsive action by providing suitable instructions to the postage metering system 25 and the mail processing centers 120 and 150.

Those skilled in the art will now recognize that the present invention substantially addresses many of the drawbacks and deficiencies associated with conventional mail processing in addition to those discussed above. Since all cryptographic verification operations (indicium verification, duplicate detection) are performed at the central postal data center 130, the overall security and integrity of the system 100 are improved but access to the cryptographic information is limited. Since the cryptographic verification operations are generally performed while the mail piece 20 is in transit from the incoming mail processing center 120 to the outgoing mail processing center 150, this significantly increases the time allotted to perform verification. This extra time enables more detailed checks to be performed. Furthermore, by migrating cryptographic verification operations to the central postal data center 130, the verification procedures may be more easily modified on an as needed basis (the current system would require major distributed system updates to be performed in order to change verification procedures).

When the mail piece 20 is scanned at the incoming mail processing center 120, the delivery route through the system 100 to the delivery location 160 is often determined using the ZIP code 33 in view of existing transportation hubs and the proximity of the delivery location 160 to available outgoing mail processing centers 150. Therefore, even further efficiencies may be available. For example, the need to broadcast the down load of the processing instruction to the entire population of outgoing mail processing centers 150 may be eliminated. Instead, the processing instructions may be directly sent to a particular one of the outgoing mail processing centers 150 corresponding to the determined delivery route of the mail piece. In this manner, the amount of data that is download and the total communications between the central postal data center 130 and the population of outgoing mail processing centers 150 is reduced.

If 100% inspection of the mail stream is conducted by the plurality of incoming mail processing centers 120, then the verification system 100 becomes a closed loop system due to the account reconciliation routine 500. Furthermore, because of the summation activity performed by the data center 130 against the mail piece data that has been collected across the plurality of incoming mail processing centers 120, it does not matter if fraudulent mail pieces 20 are being deposited with different incoming mail centers 120 in an attempt to disperse (and thus conceal) the fraudulent activity. Thus, dispersed fraudulent activity that may otherwise fall within an acceptable "noise" parameter established for a micro level of operation (individual incoming mail centers 120) may be detected at a macro level of operation (the data center 130).

Furthermore, by having a closed loop system, detection of a successful attack on the system 100 or the unauthorized release/use of postal authority and/or meter manufacturer information necessary to generate postal indicia 30 that would pass cryptographic scrutiny would be detected. Thus, the forensic analysis and counter measures associated with the response actions described above would assist in detecting and controlling this type of fraud.

If limited inspection (less than 100%) of the mail stream is being conducted by the plurality of incoming mail processing centers 120, then the verification system 100 may operate in a more selective manner. For example, the empirical activity data 134d that is actually observed may be extrapolated in view of the sampling rates employed by the incoming mail processing centers 120 to develop estimated actual activity data. This estimated actual activity data may then be compared with the reset activity 134c. If the estimated activity data is exceeds the reset activity 134c by more than a previously defined threshold amount (i.e. 20%), then the sampling rate for mail pieces 20 associated with the respective meter serial number 134b may be increased. That is, an instruction may be provided by the data center 130 to the incoming mail processing centers 120 to sample data during the preliminary mail processing tasks from mail pieces 20 containing the respective meter serial number 134b at a greater frequency (even 100%) than that employed for the mail stream at large. Thus, the data center 130 may develop more precise empirical activity data 134d.

As a further benefit, the system 100 of the present invention also increases the chance that a pair of duplicate mail pieces 20 can be captured for investigation and/or prosecution. In the current system, a duplicate mail piece 20 can only be detected after the "original" has been processed. Therefore, the current system is not set up to out sort both an original mail piece 20 and a fraudulent copy. Without both mail pieces 20, prosecution of the offender is likely to be much harder. Since the present invention performs duplicate checking while the mail pieces 20 are in transit and provides the opportunity for downstream diversion, both the original and the duplicate may be captured. In other words, if a duplicate enters the mail stream prior to delivery of the original mail piece 20, then both mail pieces 20 can be out sorted for investigation.

As yet still another benefit, the service class 39 information may be used to determine a priority for scheduling: (i) the uploading of the mail piece data; (ii) the performance of the secondary checks; and/or (iii) the downloading of the processing instructions. As examples, in this manner, the different data handling needs of a mail piece 20 that has been sent by overnight delivery may be expedited, those of a $1^{st}$ class mail piece 20 may be somewhat more moderately attended to while those of a bulk rate mail piece 20 may be addressed in an even more deliberate manner. Thus, the postal authority may more efficiently process the mail piece data based on the service class 39 in view of the amount of delivery time available, the anticipated likelihood of fraud (large volume mailings, such as bulk rate, often are targeted by fraudulent actors than lower volume mailings, such as priority mail) and other factors. As a result, the incoming mail processing center 120 may communicate more frequently with the central postal data center 130 for the purpose of uploading mail piece data associated with short delivery cycles while those of mail pieces 20 having longer delivery cycles may occur during "off peak" periods. Thus, the service class 39 may be used to set a priority for the upload of mail piece data and in analogous fashion the subsequent download of processing instructions.

Those skilled in the art will recognize that various modifications can be made without departing from the spirit of the present invention. For example, a series of central postal data centers 130 in communication with each other could be set up to share and distribute verification tasks. As another example, letter carriers or mail boxes could perform scanning of the postal indicium 30 at time of deposit. This would accelerate the input of the mail piece data into the system 100. As yet another example, a list of valid mail pieces 20 could be transmitted to the outgoing mail processing centers to ensure that fraudulent mail pieces were not introduced into the mail stream during transport due to corrupt postal authority employees or otherwise. Thus, the central postal data center 130 could download a list of valid global identification numbers. In the absence of the scanned global identification number appearing on such a list, the mail piece 20 could be diverted. As yet still another example, those skilled in the art will recognize that many of the steps and activities described above may be performed in differing orders or concurrently. As still yet another example, if the mail piece 20 is an electronic file, then the postal indicium 30 may be replaced with any other suitable indication of payment and instead of scanning the mail piece 20, the mail piece data may already be associated with the mail piece 20 such as by attachment as a header file. As still yet another example, the verification system 100 has been described with respect to an unrestricted access system where anyone may utilize the mail piece delivery network. However, those skilled in the art will recognize that the verification system 100 would work equally as well in a restricted access system (such as: subscription based delivery services and the like) where delivery services would only be provided for selected individuals and/or organizations.

As still yet another example, those skilled in the art will recognize that various modifications to the preferred embodiments described above may be made so that the inventive concepts are applied to permit mailing activity. In permit mailing activity, postage metering systems 25 are generally not used. Instead, the postal authority only excepts permit mail under controlled conditions. Typically, for permit mail, the postal authority issues a permit number to the customer and the customer brings the permit mail pieces to the postal authority along with a manifest describing the size or other characteristics of the mail run. In response, the postal authority charges or debits the customer's account accordingly. Thus, this customer account activity is directly analogous to the reset activity data 134c. As a result, the term reset activity data 134c should be construed as including any form of postal funds account record keeping that may be employed.

As yet still another example, although the data center 130 has been described generally as under the control of a single entity at a single location, this need not necessarily be the case. The postage meter manufacture may be authorized by the postal authority to conduct be in contact with the postage metering systems 25 and conduct reset operations. However, typically the postal authority is more directly involved with the processing of mail pieces 20 by the mail processing centers 130 and 150. Thus, in this scenario, an exchange of data between to the data centers 130 operated at different locations or by different entities may be required in order to practice the present invention as described with respect to the preferred embodiments.

Furthermore, although the above description has been provided with respect to pre-payment (debit from existing funds) type postage metering systems 25 (as employed in the United States), the concepts of the present invention apply equally well to post-payment (credit) type postage metering systems 25 (as employed in France). Thus, although the exact reset operations conducted for pre-payment and post-payment postage metering systems 25 may be different, the important similarities are authorization of continued use of the postage metering system 25 and/or inspection of the accounting registers contained with the postage metering system 25. Thus, reset activity data 134c should be construed as being directed to those types of activities associated with either type of postage metering system 25.

Therefore, the inventive concept in its broader aspects is not limited to the specific details of the preferred embodiments but is defined by the appended claims and their equivalents.

What is claimed is:

1. A mail piece verification system for processing mail pieces, the mail pieces having associated therewith respective mail piece data, the mail piece verification system comprising:

a data center; and a plurality of mail processing centers in operative communication with the data center;

the data center storing a plurality of account files corresponding to a plurality of postage metering systems;

the data center being configured to:

store reset data in each of the plurality of account files representative of reset activity associated with the plurality of postage metering systems, respectively;

receive the respective mail piece data corresponding to the mail pieces from the plurality of mail processing centers;

store empirical data in each of the plurality of account files representative of mailing activity associated with the plurality of postage metering systems, respectively;

conduct a forensic accounting analysis of the empirical data and the reset data associated with a selected postage metering system using a previously defined time period over which to conduct the forensic accounting analysis;

determine, by the forensic accounting analysis, that the empirical data is not consistent with the reset data for the selected postage metering system; and download graphic data to the selected postage metering system which is then included in the mail piece data of mail pieces subsequently prepared by the selected postage metering system.

2. The mail piece verification system of claim 1, wherein the data center is further configured to:

conduct an inspection of the selected postage metering system.

3. The mail piece verification system of claim 1, wherein the data center is further configured to:

issue instructions to the plurality of mail processing centers to increase a sample rate for mail pieces including mail piece data corresponding to the selected postage metering system.

4. The mail piece verification system of claim 1, wherein the data center is further configured to:

issue a new serial number to the selected postage metering system to replace an existing serial number of the selected postage metering system.

5. A method of operating a mail piece verification system for processing mail pieces, the mail pieces having associated therewith respective mail piece data, the method comprising:

receiving the mail pieces at a plurality of mail processing centers that have been prepared by a plurality of postage metering systems;

obtaining the respective mail piece data from the mail pieces;

maintaining a plurality of account files corresponding to the plurality of postage metering systems;

storing reset data in each of the plurality of account files representative of reset activity associated with the plurality of postage metering systems, respectively;

using the respective mail piece data, storing empirical data in each of the plurality of account files representative of mailing activity associated with the plurality of postage metering systems, respectively;

conducting, by a data center, a forensic accounting analysis of the empirical data and the reset data associated with a selected postage metering system using a previously defined time period over which to conduct the forensic accounting analysis;

determining, by the forensic accounting analysis, that the empirical data is not consistent with the reset data for the selected postage metering system; and downloading graphic data to the selected postage metering system which is then included in the mail piece data of mail pieces subsequently prepared by the selected postage metering system.

6. The method of claim 5, further comprising:
conducting an inspection of the selected postage metering system.

7. The method of claim 5, further comprising:
increasing a sample rate at the plurality of mail processing centers for mail pieces including mail piece data corresponding to the selected postage metering system.

8. The method of claim 5, further comprising:
issuing a new serial number to the selected postage metering system to replace an existing serial number;
allowing normal processing of mail pieces containing the new serial number; and
instructing the plurality of mail processing centers to withhold normal processing of mail pieces containing the existing serial number.

9. A method of operating a data center for processing data associated with mail pieces and a plurality of postage metering systems for preparing the mail pieces, the method comprising:

obtaining reset data representative of reset activity associated with the plurality of postage metering systems;

obtaining empirical data representative of mailing activity associated with the plurality of postage metering systems;

conducting, by the data center, a forensic accounting analysis of the empirical data and the reset data associated with a selected postage metering system using a previously defined time period over which to conduct the forensic accounting analysis;

determining, by the forensic accounting analysis, that the empirical data is not consistent with the reset data for the selected postage metering system; and downloading graphic data to the selected postage metering system which is then included in the mail niece data of mail pieces subsequently prepared by the selected postage metering system.

10. The method of claim 9, further comprising:
conducting an inspection of the selected postage metering system.

11. The method of claim 9, further comprising:
issuing a new serial number to the selected postage metering system to replace an existing serial number;
providing instructions to allow normal processing of mail pieces containing the new serial number; and
providing instructions to withhold normal processing of mail pieces containing the existing serial number.

* * * * *